Oct. 29, 1963

W. KREBS 3,108,908

HERMETICALLY SEALED STORAGE BATTERY
AND METHOD FOR ITS MANUFACTURE

Filed Jan. 6, 1959

INVENTOR.
WILLI KREBS

BY
Nolte & Nolte

ATTORNEYS

Oct. 29, 1963

W. KREBS 3,108,908

HERMETICALLY SEALED STORAGE BATTERY
AND METHOD FOR ITS MANUFACTURE

Filed Jan. 6, 1959

INVENTOR.
WILLI KREBS

BY

Nolte & Nolte
ATTORNEYS

INVENTOR.
WILLI KREBS
BY
Nolte & Nolte
ATTORNEYS

United States Patent Office 3,108,908
Patented Oct. 29, 1963

3,108,908
HERMETICALLY SEALED STORAGE BATTERY
AND METHOD FOR ITS MANUFACTURE
Willi Krebs, Schwalbacherstrasse 3,
Wiesbaden, Germany
Filed Jan. 6, 1959, Ser. No. 785,254
Claims priority, application Germany Jan. 11, 1958
37 Claims. (Cl. 136—6)

The present invention relates to a hermetically sealed storage battery.

In storage batteries of this type, it is a serious problem to avoid the difficulties caused by the generation of excess pressure due to the gas formation in the last stage of charging the storage battery or in the overcharging of the battery.

Many attempts have been made to overcome these difficulties. One way of doing this is to use an adsorptive separator between the two electrodes capable of taking up the gases generated in the storage battery during the above-mentioned periods. However, the adsorptive power of the separator is quite limited and will not be sufficient to eliminate any considerable quantity of gas, so that excess pressure in the interior of the battery will eventually lead to serious damage or destruction of the casing.

Another attempt to overcome the difficulties attendant to the gas pressure is to make the separator with perforations, and to have the electrolyte cover a part of the electrode surface in the form of a thin skin. This is done to enable the gases to contact the active mass of the electrode during the discharge of the battery and eliminate them by chemical reaction. This will not, however, permit the absorption of gases generated during the charging operation in order to prevent any excess pressure from being generated in the interior of the battery casing.

In order to avoid excess pressure from building up in the storage battery to a level which will lead to destruction of the casing, it has also been proposed to disconnect the charging current by automatic means when it is found by exploration that the casing walls will start to bulge excessively. However, the storage battery can then no longer be completely charged.

Finally, it has been attempted to counteract gas formation, at least in part, by making the capacity of the negative electrode twice as large as that of the positive electrode. The idea was that toward the end of the charging operation, or upon over-charging, the negative electrode would still be capable of converting the active electrode mass, whereas oxygen would be formed at the positive electrode in an amount equal to only one third of the normal gas formation. This method did not give entirely satisfactory results, either, and did not lead to batteries which could be charged and recharged any desired number of times.

It is the main object of the present invention to provide a hermetically sealed storage battery in which the gas pressure in the interior of the casing can be effectively and automatically controlled.

It is another object of the invention to provide means by which the electrodes in a hermetically sealed storage battery are so designed that they will automatically interrupt charging of the battery when a certain limit pressure has been reached.

The objects of the invention can be accomplished by providing within a casing at least one electrode made of highly porous fiber material and having a hollow space, e.g., a cavity, capable of receiving a mixture of active electrode mass and a gas-adsorbing material. By an arrangement in which at least one such electrode is provided, any excess pressure caused by the presence of gas can be readily eliminated by the adsorption in said mixture. Instead of one cavity, a plurality of small hollow spaces may be provided in one electrode, or in several electrodes.

The arrangement according to the invention further provides that pressure created in the interior of a storage battery upon overcharging causes an increase in the internal resistance of the electrodes to such an extent that the charging current will be decreased, thus in turn diminishing the gas pressure and limiting it to a level at which the casing will not be damaged.

The storage battery according to the invention comprises a plurality of electrodes, at least one of which is constructed as mentioned above. However, several electrodes may be so constructed. By the combination of electrodes, having a cavity filled with a mixture of gas-adsorbing material and active mass, with electrodes without such a cavity, the gas formed in the electrode without the cavity will displace the electrolyte from this electrode, which will then be absorbed by the electrode with the cavity therein. The internal resistance of the electrode from which the liquid electrolyte has been removed, will then be increased to such an extent that the charging current will be reduced and less gas will be formed, so that the casing will not be damaged. When the charging current is cut off, the electrolyte will again be equally distributed in the two electrodes by diffusion and by capillary action so that the storage battery will be ready for discharge at low internal resistance.

The storage battery according to the invention has the added advantage that the mixture of active mass and gas adsorbing material in the cavity of one of the electrodes provides within the electrode proper of the storage battery, the main electrode, a second or additional electrode having the same polarity, but a considerably higher internal resistance than the main electrode. When the charging operation nears the end, the additional electrode will be more heavily charged due to polarization of the main electrode. In the additional electrode the charging can only proceed very slowly due to the high internal resistance mentioned above. If gas is, nevertheless, generated in the main electrode, it will be adsorbed by the adsorptive material, e.g., carbon. While the storage battery is in operation, adsorbed gas and active mass are in intimate contact so that the latter mass will chemically react comparatively rapidly with the adsorbed gas. In this manner, an effective elimination of the gas is accomplished.

In a preferred embodiment of the storage battery, according to the invention, all the electrodes are provided with cavities for receiving the gas adsorbing mixture. It is thus accomplished that the electrolyte displacement from one electrode is delayed until actually both electrodes are completely charged and gas will be formed at both electrodes which is adsorbed by the gas-adsorbing mixture in the respective cavities. When gas formation in one electrode exceeds the adsorptive capacity of the adsorbing material therein, the above described displacement of electrolyte is started and the automatic limitation of the pressure in the casing is brought about.

A further possibility for delaying the displacement of the electrolyte from one electrode, consists in making the negative electrode with a considerably larger capacity than the positive one.

In another preferred embodiment of the invention, the storage battery may consist of two nested cups fitted into each other and electrically insulated from each other; the electrodes are joined to the cups by sintering, or just the positive electrode is so made. This is a simple manner to insure good contact between parts of the casing and the electrodes, which will not be interrupted even if the pressure increases in the interior of the storage battery despite the preventive measures of this invention. By joining the electrodes to the casing walls through sintering, the casing is, furthermore, considerably reinforced and gases generated during the charging operation will not be capable of deforming the casing, but will be forced to pass into the adsorber.

One advantageous method for making a hermetically sealed storage battery according to the invention, may be performed as follows.

An electrode body consisting of highly porous material, preferably of matted fiber, with or without a metal powder, or consisting entirely of metal powder, is inserted in a cup-shaped part of the casing, which may be made of nickel-coated steel. The electrode and casing are sintered together, and the electrode is charged in a known manner with the active mass, and subjected to compression in such a manner that a central cavity is formed therein. Then the cavity is filled with a gas-adsorbing mixture and covered with a porous closure member which is, preferably, electrically conductive; as a closure member, a second electrode body charged with an active mass may be used. This is a very simple and rapid manufacturing process of a hermetically sealed storage battery according to the invention. In order to avoid difficulties which might arise due to temperature expansion of the casing, a foil may be inserted between the shell of the electrode body and the wall of the casing before the electrode body is sintered to the casing which foil is then removed after the sintering process. In another way to prevent sintering of the parts together, the wall of the casing may be coated with a layer which evaporates during sintering, or can easily be removed after sintering. A graphite coating may be used for this purpose.

For making a hermetically sealed storage battery in which cup-shaped units are used, the outer electrode may be made from a continuous tubing or from two half-tubings cut to the desired length, whereafter the outer pre-shaped electrode is provided with the active mass and the cup placed thereon. Another method for making the outer electrode consists of inserting it into the cup, joining it by sintering to the wall of the cup, and activating it thereafter.

Yet another method for making the outer electrode uses an endless band which is sintered to another band-shaped member which will form the wall of the cup; this double layer is cut, brought into cup shape by means of a mold or over a mandrel, and the seam hermetically sealed. If desired, adsorptive material may be placed between the two bands before sintering them together which material may be in the shape of porous tablets, rods or the like; after sintering, the outer electrode is activated in a manner known per se. During the activation, the porous adsorptive material is also charged with electrode mass. The third component of the mixture is an electrolyte which is likewise adsorbed when it is filled into the storage battery cell.

In storage batteries using coiled electrodes, the electrodes may have small inserts containing a gas-adsorbing material. Or, alternatively, one of the electrodes may have a hollow projection in which gas-adsorbing material is accommodated. Such a projection can either be inside or outside of the coil.

In the manufacture of a storage battery with coiled electrodes, little plates of porous gas-adsorbing material e.g., carbon, can be disposed between two porous bands of supporting material for the active mass which will later be sintered; after the bands have been sintered, they are charged in a known manner with an active mass, which will penetrate simultaneously into the gas-adsorbing material.

Several embodiments of the storage battery according to the invention will now be described with reference to the accompanying drawings.

In the drawings:

FIGS. 1 to 4 show a number of storage batteries in button shape;

FIGS. 5 to 7 diagrammatically illustrate the manufacture of an electrode securely fixed in a casing;

Figure 1:
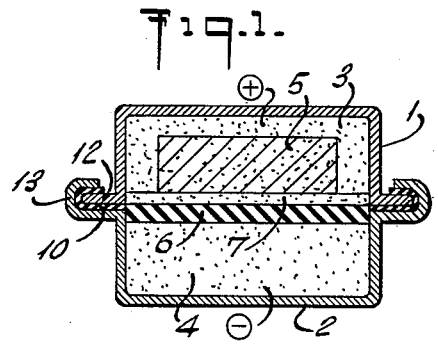
Figure 2:
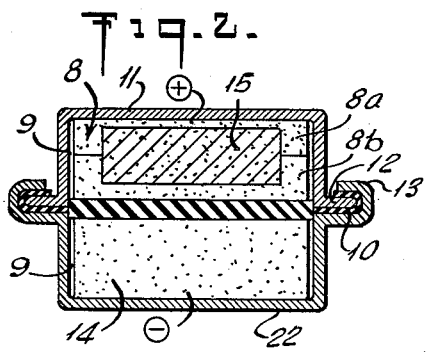

Referring now to FIGS. 1 and 2 of the drawings, the electrodes 3, 4 and 8, 14 are snugly fitted into the cup-shaped parts 1, 2 and 11, 22, respectively, of the casing and sintered at least in part, to the inner metal walls of the same.

The embodiment according to FIG. 1 shows by way of example, a hermetically sealed nickel-cadmium storage battery in which the positive electrode 3 has a cavity, or recessed portion, 5 which faces the negative electrode 4. The cavity is filled with a mixture containing a gas-adsorbing component, such as active carbon or the like; an active mass, for instance nickel hydroxide, which is also present in the positive electrode 3; and an electrolyte, for instance potassium hydroxide, which is also used in the other parts of the storage battery. The mixture is preferably electrically conductive.

A separator between the two electrodes is designated by 6. In order to prevent the gas-adsorbing mixture from penetrating from cavity 5 into the separator 6 and thereby short-circuiting electrodes 3 and 4, a porous plate 7 is provided, preferably consisting of the same material as electrode 3.

The electrodes 3 and 4 preferably consist of sintered porous bodies which are joined by sintering to the walls and bottoms of casing parts 1 and 2. This provides for very good current flow from the electrodes to the casing walls, a factor which is of great importance in gas- and liquid-tight storage batteries, where excess pressure generated toward the end of the charging operation or during over-charging of the battery may lead to defective contact between casing and electrodes, or electrodes and terminals. The connection of the electrodes and the casing walls by sintering safely prevents this.

The wall of cup 1 has a flanged portion 12 and the wall of cup 2 a crimped portion 13 which by engagement provide the sealing of the cell. An electrically insulating packing 10 completes the hermetical sealing between the two cups.

By providing the positive electrode with a cavity 5, as shown in FIG. 1, the capacity of the negative electrode is made considerably larger than that of the positive electrode.

In the embodiment of the invention illustrated in FIG. 2, the negative electrode 14 is similar to electrode 4 in FIG. 1; the positive electrode 8, however, is made in two parts, which are designated by 8a and 8b. Both parts are cup-shaped and when combined, form a cavity 15 filled with the gas-adsorbing mixture. Another feature of this embodiment consists in the provision of an annular gap 9 between casing walls 11 and 22, and electrodes 8 and 14, respectively, which prevents the transmittal to the electrodes of an expansion or a shrinkage of the casing occurring upon temperature rise or decrease.

The closure members 12, 13 and 10 are similar to those described in FIG. 1 and serve the same purpose.

Figure 3:
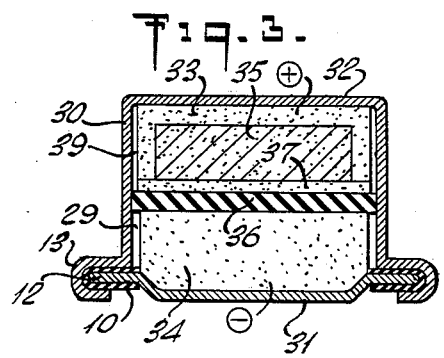

FIG. 3 shows a single cup-shaped casing 30 into which a positive electrode 33 is fitted taking up about half of the casing height and being joined with the end wall 32 by sintering. An annular gap 39 is again left between the side wall of the casing and the electrode. Electrode 33 likewise has a cavity therein, designated by 35, which is filled with a gas-adsorbing mixture. A porous, electrically conductive plate 37 is placed over the cavity. This closing plate may consist of the same material as the electrode 33 and take part in the electrochemical reaction. A lid 31 forms a closure member of the casing and serves as a support for the negative electrode 34, which is sintered thereto. Electrode 34 has a smaller diameter than the internal diameter of cup 30 in order to make sure that the electrode will not contact the wall when the temperature varies. The annular gap 29 may be filled with an insulating material in order to avoid short-circuiting. As usual, a separator 36 is arranged between the two electrodes.

Figure 4:
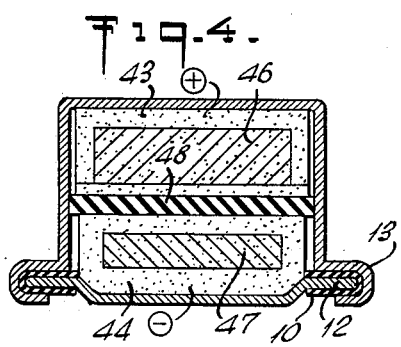

In the embodiment illustrated in FIG. 4, both electrodes 43 and 44 have cavities 46 and 47, respectively, both being filled with gas-adsorbing mixtures. The other features of the embodiment shown in FIG. 4 are similar to those shown in FIG. 3, and described with respect thereto. The cavity 47 is closed by a separate plate 48 which may be of the same material as electrode 44.

Figure 5:
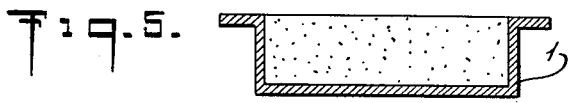
Figure 6:
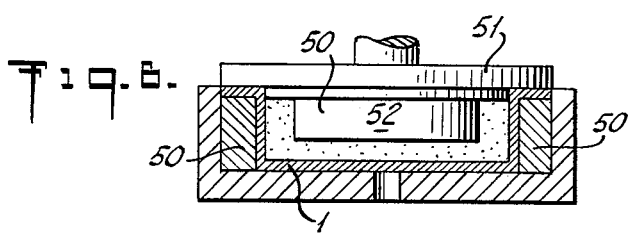
Figure 7:
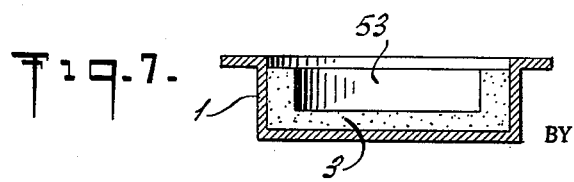

The manufacture of the storage battery according to FIG. 1, is shown by way of example in FIGS. 5 to 7. A cup-shaped casing 1 is first filled loosely with material forming the sintered structure of one of the electrodes. Any material may be used, which upon sintering will form a highly porous body capable of receiving the active electrode mass and having sufficient electric conductivity. More particularly, electrically conductive fibers may be used to which may be added some porous pulverulent material. Very suitable materials are metallic fibers, such as metal chips produced by cutting or machining and subsequently roughed at the surface; these chips may sometimes be galvanically treated and mixed with conductive fibers to which a metal powder, preferably metal carbonyl powder, is added. Another material to be used for forming an electrode structure is an insulating fiber of plastic, e.g., polyvinyl fiber, made electrically conductive. We also may use powdered materials having hollow granules or powders made by reduction of oxides, or the like.

Let us assume that the cup shown in FIG. 5 is to be used for housing the positive electrode of the storage battery. Cup 1 and the substance contained therein, which is to form a structure, are subjected to sintering, preferably at reducing conditions. The resulting body is a casing filled with an electrode structure sintered to the bottom and side walls of the casing. If such a sintering is undesirable between the side walls of the casing and the electrode, a foil may be inserted between these casing walls and the material forming the electrode structure, or the wall may be insulated by application of a coating of graphite, or the like.

The piece made as described is subsequently activated in a conventional manner, for instance by precipitation of a concentrated metal salt solution with hot alkali hydroxide solution. The operation of activation, alternating with rinsing and drying, is repeated until the hollow spaces of the sintered structure are filled with metal hydroxide. This portion of the storage battery is then inserted into a press shown in FIG. 6 having jaws 50 through which pressure is applied on the walls of casing 1. A die 51 compresses the material inside the casing from above. The die has a central projection 52 which exerts an increased compressing action at the center of the electrode thereby shaping a cavity 53. When the electrode is taken out of the press, it has the shape shown in FIG. 7. By the compression of the sintered structure filled with active mass, the non-conductive hydroxides are brought into intimate contact with the electrically conductive structure so that all active components are made to take part in the charging and discharging of the storage battery. The volume of the electrode is also reduced by the compression so that it will require less space.

In the next step of the manufacturing process, the gas-adsorbing substance is introduced into the cavity 53 in the form of a pasty mixture with active electrode mass. The electrode with its cavity is then covered by a porous plate 7, preferably made of the same material and with the same structure as the electrode itself. The negative electrode of the storage battery may be made in a similar manner.

In making such electrodes, it is also possible first to compress the electrode mass before activating it and to introduce it into the cavity with gas-adsorbing material, particularly active carbon, then to close the cavity by the porous cover plate 7 and to charge it with active mass. In this case, the gas-adsorbing material is also combined with active electrode mass and is converted into a mixture of adsorbing material and active mass.

After the two cups of a cell have been manufactured as described, they are filled, for instance, with potassium hydroxide (spec. gravity 1,2), formed, and closed after interposition of a separator and an electrically insulating gasket.

The storage battery cell described is in the shape of a button to be used for various small appliances. However, the invention is not limited to gas-tight storage batteries in this shape but may have any desired shape.

Figure 8:
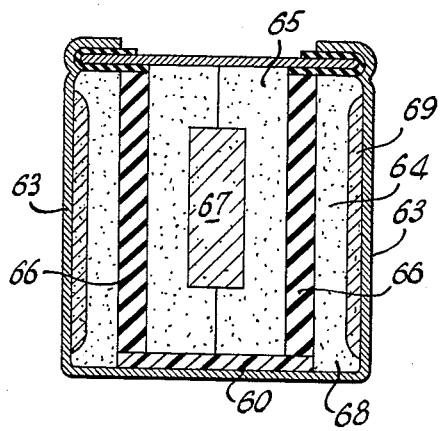
FIG. 8 shows a cup-shaped storage battery according to the invention, in longitudinal section.
Figure 9:
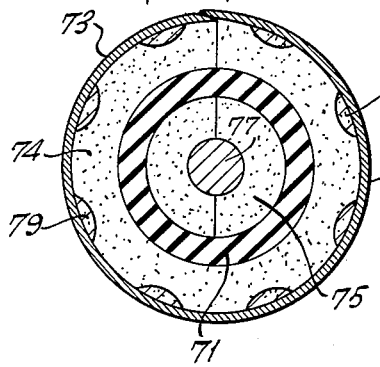
FIG. 9 shows a cup-shaped storage battery in transverse section.

In FIGS. 8 and 9 a different embodiment of the storage battery according to the invention is illustrated. FIG. 8 shows an outer electrode which may be tube-shaped or may be built up of two halves of a cup. Preferably, the outer electrode 64 conforms to the inside of a casing 63. The outer electrode can be manufactured by cutting a long tubing into individual smaller tubes. These are inserted in the casing 63. As shown in FIG. 8, the electrode 64 has dish-shaped recesses on its outside leaving a free space 69 between the electrode and the casing 63, the space being bounded by portions 68 of electrode 64. The free spaces 69 are filled with gas-absorbing mass, e.g. graphite, activated charcoal, or diatomaceous earth. 66 is a conventional separator.

Figure 10:
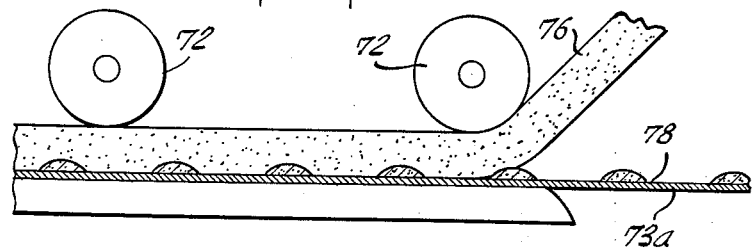
FIG. 10 illustrates diagrammatically the manufacture of the outer electrode of a storage battery according to FIG. 9.

A somewhat modified electrode is shown in FIG. 9. In this case, an electrode 74 is sintered to a casing wall 73. Tablet- or rod-shaped inserts 79 are provided between the electrode and the casing wall which consists of gas-adsorbing mixture. This embodiment of the invention is particularly simple to manufacture. The casing wall 73 and the supporting structure of the outer electrode 74 with the tablet-shaped or rod-shaped inserts 79 containing gas-adsorbing material, particularly active carbon, are in the shape of endless bands. This may be done substantially as shown in German Patent 860,301, and as illustrated in FIG. 10. It will be advantageous to make the support for the outer electrode as a matted web 76 of slightly smaller width than that of a metal strip 73a which will form the outer casing wall for the finished electrode. Before the members 76 and 73a are combined, by being passed over a bed 70 where the electrode-forming band 76 is pressed onto the casing-forming band 73a by rollers 72, the above-mentioned inserts for gas-adsorbing material are placed thereon in spaced relationship (see 78 FIG. 10). Bands 76 and 73a are then combined by compression and sintering. Thereafter, the so prepared workpiece is cut into individual pieces in the size which fits the cup 63 in FIG. 8. Preferably, the electrode is then shaped by bending over a mandrel and the ends are joined by soldering or welding. Finally, the electrode is filled with active mass which will also enter the inserts 78 or 79.

In both embodiments, the one shown in FIG. 8 and the other one shown in FIG. 9, the positive electrode 65 or 75, respectively, may have a cavity 67 or 77, respectively, which is filled with gas-adsorbing mixture. The mixture has the same composition as described above. In order to form the cavity, the inner electrode 65 or 75 may be made of two halves. These may be filled with active mass to which a gas-adsorbing substance, e.g., active carbon, may be mixed. The storage battery is assembled, with a separator 71 added, filled with electrolyte, and sealed.

Figure 11:
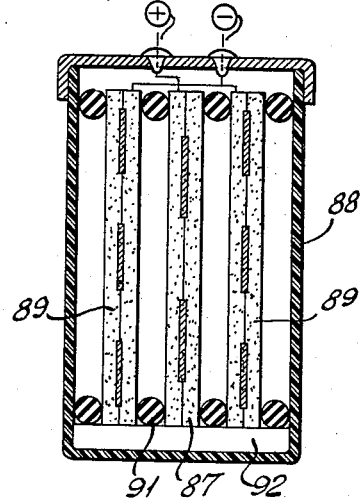
FIG. 11 shows a storage battery cell with several plate-shaped electrodes according to the invention.

In the embodiment of FIG. 11, a hermetically sealed storage battery having plate-shaped electrodes is shown. These are housed inside a casing 88 made, for instance, of electrically insulating material. The electrode plates are designated by 87 and 89. Between the two plates spacers 91 are arranged which prevent contact between the plates. In the embodiment shown, two negative electrodes 89 and one positive electrode 87 are provided. In this way, the capacity of the negative electrodes will be considerably higher than that of the positive one. The plates are supported by a structure 92 which serves to prevent an accumulation of electrically conductive sludge at the bottom of the casing.

The electrode plates 87 and 89 are made of two layers each, having therebetween inserts of a gas-adsorbing substance mixed with active electrode mass. Such plates may be similarly made as the ones described with reference to FIG. 10, except for the difference that instead of combining a sheet metal strip and a matted support, two continuous bands of electrode material are brought together and sintered after having inserted therebetween gas-adsorbing material in the shape of tablets or rods. When thicker electrode plates are used, these may be made with recesses to begin with before they are sintered and the recesses may be filled with a pasty mixture of the gas-adsorbing substance, whereupon they are assembled between frames and welded or glued together.

Figure 12:
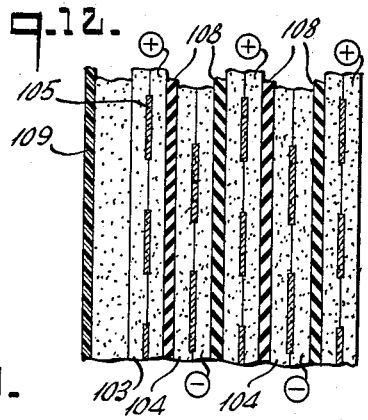
FIG. 12 illustrates, in section, a hermetically sealed storage battery built up of coiled electrodes.
Figure 13:
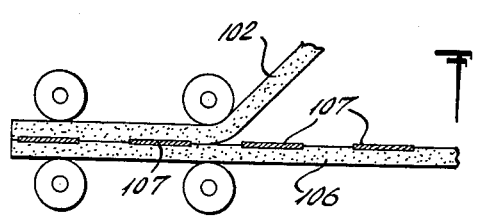
FIG. 13 shows diagrammatically a manufacturing process of an electrode according to FIG. 12.

FIG. 12 shows an embodiment in which the electrodes consist of thin foils which are made into a coil. In this case, too, the electrodes may be made of two layers 103 and 104, and between the layers thin inserts 105 of gas-adsorbing material may be disposed. The manufacture of such foil-shaped electrodes is diagrammatically shown in FIG. 13. For instance, two porous metal fleeces 102 and 106 are combined after thin plates or rods 107 filled with gas-adsorbing mixture have been placed therebetween. The two layers 102 and 106 are then sintered together. When these electrodes are activated, the inserts 107 are likewise charged with active electrode mass. The so prepared positive and negative foils are assembled with interposition of separators 108 and are then wound, or folded, or coiled, or the like, whereupon they are placed into a casing 109 which is finally sealed.

Figure 14:
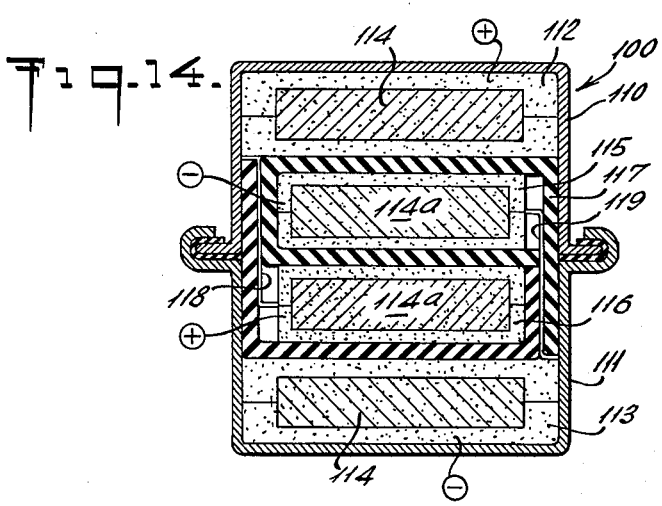
FIGS. 14 and 15 illustrate embodiments of the invention in button-shape with cells having more than two electrodes.
Figure 15:
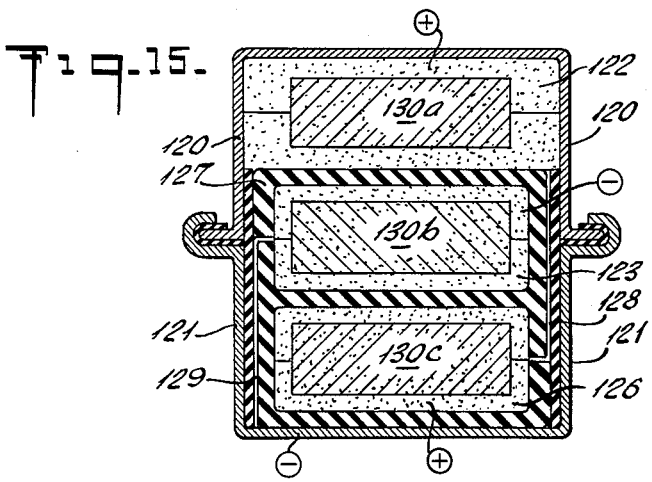

In FIGS. 14 and 15, button-shaped cells are shown which have more than two electrodes. FIG. 14 shows an arrangement similar to FIG. 1, wherein a positive electrode 112 is inserted in one half 110 of a casing 100, and in the other half 111 of the casing 100, a negative electrode 113 is inserted. Contrary to the embodiment shown in FIGS. 1 and 2, each one of the electrodes only takes up half of the height of the divided casing. Both electrodes have a cavity 114 filled with a mixture of gas-adsorbing material and active mass. Between the two electrodes 112 and 113, two more electrodes, namely, a second negative electrode 115, and a second positive electrode 116, are arranged. The second positive electrode corresponds in composition and structure to the first positive electrode 112, it is slightly smaller so that it can be electrically insulated from the housing wall 110. The same applies to negative electrode 115, as compared to the first negative electrode 113. Both second electrodes have cavities 114a filled with a mixture of gas-adsorbing material and active mass. The spatial arrangement of the electrodes is so made that the second negative electrode 115 is placed between the two positive electrodes, whereas the second positive electrode 116 is placed between the two negative electrodes. In order to insulate the two second electrodes from each other and from the first electrodes, they are wrapped into a sheath of porous separator material 117. The second positive electrode 116 is connected in parallel with the first positive electrode 112 by means of a wire 118. The wire is connected with one of its ends to the second positive electrode 116 and with the other end to the wall of the casing 110. Likewise, the second negative electrode 115 is connected in parallel with the first negative electrode 113 by means of a connecting wire 119, leading from the second negative electrode 115 to the casing wall 111.

FIG. 15 illustrates another embodiment of the invention, in which a cell is composed of three electrodes, two positive electrodes 122 and 126, and one negative electrode, 123. The first positive electrode takes up two thirds of the casing part 120, into which it is inserted. The second positive and negative electrode are assembled into a unit by being wrapped with separator material 127 and when they are placed into the part of the casing designated by 121, they are insulated from the wall thereof. The separator material also extends between the first positive and the negative electrode and between the latter and the second positive electrode. In this arrangement the negative electrode will be placed between the two positive electrodes. Connecting wires 128 and 129 are provided for making connections between the electrodes and the casing walls as shown. Wire 128 connects the two positive electrodes and leads therefrom to the wall of casing part 120. Wire 129 connects the negative electrode to the casing part 121.

All the electrodes have cavities therein, which are respectively designated by 130a, 130b, and 130c, and which are filled with gas-adsorbing material in mixture with active mass.

Figure 16:
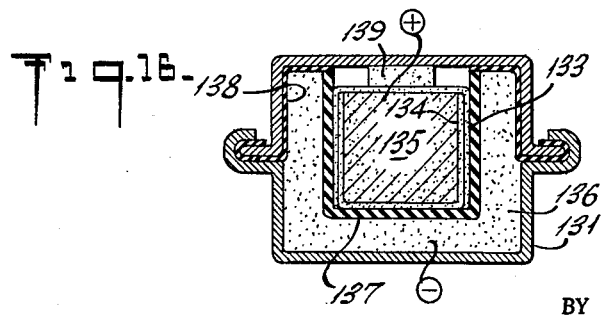
FIG. 16 is a further embodiment of the invention.

FIG. 16 will be later described with reference to one of the examples.

In the following, the storage battery made according to the invention will be explained more fully in a number of examples but these are given by way of illustration and not of limitation.

*Example 1*

Iron fibers of 1µ thickness which are nickel-coated and roughened at the surface, are arranged in loose layers into a small cup of nickel-plated sheet iron of 0.3 mm. thickness from which a positive electrode will be made, as shown in FIGS. 5–7. For the negative electrode, iron fibers of about the same thickness which are roughened at the surface but not nickel-coated, are loosely arranged in iron cups. The filled cups are then exposed to a reducing atmosphere, e.g., hydrogen, at a temperature of 980 to 1000° C., i.e. at incandescent heat, for about one hour, until the fibers are sintered together and joined to the inner surfaces of the cups.

Activation then takes place in the highly porous sintered structure, which fills the cups, by precipitation of metal hydroxide from metal salt solutions by means of hot alkali hydroxide solution. For instance, the positive electrode is impregnated with nickel-sulphate solution, from which nickel hydroxide is precipitated by means of hot 30% sodium hydroxide. The negative electrode is impregnated with cadmium nitrate solution, and cadmium hydroxide is precipitated therefrom with hot potassium hydroxide. Impregnation and precipitation is followed by rinsing and drying, and the procedures are repeated several times until the pores of the supporting structure are filled with nickel hydroxide and cadmium hydroxide, respectively, that is to say, filled with active mass.

The cup from which the positive electrode is made, is then inserted in a die as shown in FIG. 6 and the sintered structure 3 filled with active mass is compressed to form a cavity 53. By the compression, the electrically non-conductive nickel-hydroxide particles are brought into close contact with the metal parts whereby a greater effectiveness of the electrode is obtained. The cavity 53 is filled with a mixture of active mass, a gas-adsorbing substance, and an agent which promotes the conductivity. The adsorbing substance may be active carbon with graphite flakes, the conductivity-promoting material may be nickel powder, nickel flakes, nickel-coated metal fibers, and the like, and the active mass is nickel hydroxide.

One way of filling the cavity is application of a pasty mixture. Another way consists in compressing a tablet from the mixture and placing it into the cavity. The filled cavity is covered by the sintered plate 7 which is likewise impregnated with active mass.

In this example, the negative electrode has no cavity. It is only impregnated with active mass and compressed, if desired.

Both electrodes are moistened with potassium hydroxide of the specific gravity 1.24 and covered with a separator 6 resistant to the electrolyte, consisting, for instance, of a textile fabric, nylon-mesh, blotting paper, or the like. The two prepared cups are combined, with interposition of an electrically insulating member, by crimping the edges of one cup over the flange of the other cup, and hermetically sealed. The cell of the storage battery can be formed after having been closed. However, forming may also occur in open condition of battery.

*Example 2*

This example relates to a hermetically sealed storage battery as shown in FIG. 14. In this embodiment, all electrodes have cavities filled with active mass in combination with adsorptives and with conductivity-promoting agents.

The upper portion 110 and the lower portion 111 are provided with a sintered metal-fiber structure having cavities filled with the above described mixture of active mass, adsorptive agent, and conductivity-promoter and covered with the second electrode. As distinguished from the electrodes described in Example 1, the electrodes in the instant example only take up half the height of their respective cups.

The following mixture is used for filling the cavities of the negative electrodes:

5% by weight ferrum reductum
8% by weight nickel flakes (or nickel powder or fiber)
6% by weight mercury oxide
5 to 20% by weight carbon mixed with active carbon
balance: cadmium hydroxide For filling the cavities of the positive electrodes, the following mixture will be used:

20–40% by weight carbon,
5–10% by weight nickel flakes, nickel powder or fibers,
balance: nickel hydroxide.

If desired, antipolarizing agents can be admixed.

The second positive electrode may be substantially made in the same manner as the first one; the same applies to the negative electrodes. Electrical connection between the electrodes is made by nickel-wire.

The electrodes are moistened with potassium hydroxide of specific gravity 1.24, assembled, sealed and formed as described in Example 1.

*Example 3*

This example deals with the storage battery illustrated in FIG. 15. Only the first positive electrode is joined by sintering to the metal casing 120. In other respects, the electrodes are made in accordance with Example 2.

One of the characteristic features of the hermetically sealed storage battery according to the invention consists therein that the gases generated towards the end of the charging operation are at first adsorbed by the gas-adsorbing material. There is intimate contact between the gases and the material adsorbing the same, as well as with the active mass admixed to said material, due to the large contacting surface and the fine distribution of the gas. There will always be a balance between adsorbed gases and active mass and, as a consequence, the generation of gas will be counter-acted and chemically reversed as the operation goes on.

By the compression, the efficiency of the active substance in the sintered structure will become practically equal to the theoretical value.

The composition for the mixture of gas-adsorbing material and the active mass has proven advantageous in the ratio of about 20–60% gas-adsorbing material, e.g., active carbon, and about 80–40% active mass, e.g., nickel hydroxide. If the mixture is to be used in the form of a paste or of tablets, the components have to be mixed intimately in a manner and by means known in the art.

*Example 4*

For making a positive electrode, a nickel-plated cup of 0.3 mm. thickness and 20 mm. diameter is used, which is comparatively narrow and 8 mm. high; into the cup, 10 pieces of matted glass-fiber each 0.2 mm. thick and 20 mm. in diameter, are placed in superimposed relationship. The glass-fiber mats are composed of threads measuring 5–10$\mu$ and pieces of 20 mm. diameter are cut out from the mat as mentioned. The fibers are covered with silver, for instance, in a high vacuum, with a sheet of 1$\mu$ and then nickel-plated by galvanization to a plate thickness of 10–30$\mu$. As mentioned above, the glass-fiber mat is 0.2 mm. to begin with, so that after silver and nickel-plating the superposed pile will have a total thickness of 6 mm. The mats are slightly compressed and sintered together at 1000° C., whereby the result is a final thickness of 5 mm. The activation of the electrode structure occurs as described in the previous examples. After activation, the electrode package is compressed at a pressure of about 5 tons per cm.$^2$ with formation of a cavity as described with respect to FIGS. 5–7. Into the cavity, a tablet consisting of the described mixture is then placed. The exact composition of the tablet may be as follows:

10% by weight wheat flour,
10% by weight calcined Kieselgur,
20% by weight active carbon,
10% by weight conductivity-promoting agent, e.g., nickel powder, flakes, fibers, or the like.
45% by weight nickel hydroxide as active electrode mass, and
5% by weight depolarizer, e.g., cadmium oxide or aluminum oxide.

For making the tablet, chemically pure nickel hydroxide is pasted with the above-named components in powder form and with distilled water, and is then compressed in a mold under slight pressure. The pre-shaped tablet is dried and finally compressed in the same mold at a pressure of 5 tons per cm.$^2$. The so shaped tablet is placed into the cavity, which is covered with a sintered plate made in the same manner as the positive electrode, with which it is in contact.

For making the negative electrode, fibers of chemically pure iron are taken which are 3–5$\mu$ strong and are made into a highly porous, sintered fleece of 0.5 mm. thickness, as described in the co-pending application Serial No. 774,489, filed November 17, 1958. From this fleece, cups are formed by deep-drawing which are nested in pairs. The cup formed by such a pair should have an outer diameter of about 18 mm. and a height of about 5 mm. The small cups so formed are activated with cadmium hydroxide as described above. The hollow space between the two nested cups are filled with a powdered mixture of adsorbent material, active mass and conductivity-promoting agent. The active mass is again cadmium hydroxide. As adsorbent 5% by weight of quartz flour are added. For better conductivity, 5–7% yellow mercuric oxide are added. Further agents for improving conductivity can be added in the form of metal fibers, flakes, powders, and the like, as described for the positive electrode. In addition to the active electrode mass, namely the cadmium hydroxide, 15% by weight of ferrum reductum may be admixed for increasing the activity of the cadmium hydroxide. The cup filled with the powder mixture is compressed to a 3 mm. tablet by a pressure of 5 tons per cm.$^2$. Such a tablet is placed into the nickel-plated cup onto the positive electrode with interposition of the usual microporous separator. The assembled element is moistened with 10 drops potassium hydroxide of the specific weight 1.2 sealed, and formed. If this forming is to be carried out with the battery in closed condition, it is necessary to use all the chemicals in pure state. Otherwise the electrodes are formed before the casing is sealed.

*Example 5*

The cell of the storage battery is made as in Example 4, with the difference, that for making the positive electrode a fleece of natural textile or synthetic fibers is used. The fleece is moistened with silver vapor and coated with nickel, whereupon small pieces are cut out which are not sintered together, but are merely compressed together in the cold, so that they will slightly swell while the storage battery is in operation and this will cause the outer surfaces of the electrodes to be pressed against the inner surfaces of the casing end walls. If desired, the small pieces of fleece may be sintered together, in which case the supporting fibers are burnt up and a highly porous electrode structure will result.

When no sintering occurs, a reinforcement of the electrode may be effected by nickel-coating the compressed structure for maintaining the fibrous mat structure and the cavity formed in the electrode.

Instead of quartz flour added in accordance with Example 4, manganese dioxide is added to the powder mixture of the negative electrode which acts at the same time as adsorbent and as depolarizing agent.

*Example 6*

This example will be described with reference to FIG. 16, which shows a deep-drawn nickel plated casing 131 in which a positive electrode is built up. For this purpose, a fiber-fleece having pre-sintered fibers of nickel-coated iron chips is shaped into two small cups 133 and 134 which are snugly fitted together. The nested cups have an outer diameter of about 15 mm. and a height of about 5 mm. These pre-shaped cups of fleece are activated with nickel-hydroxide in a manner known per se. The cavity 135 within cup 134 is filled with a tablet of the composition described for the positive electrode in Example 4.

The negative electrode is made of a highly porous fiber fleece of pure iron fibers having a thickness of 2 mm. A small cup 136 is made by deep-drawing which has an outer diameter of 20 mm. and an even wall thickness of 2 mm. The cup is activated in a known manner with cadmium hydroxide and accurately calibrated for size while, at the same time, active mass and metal fibers are more tightly compressed. The cup is then inserted in the casing 131. Into the central cavity of this cup, a conventional separator 137 of porous material is placed, whereupon the positive electrode is inserted into the separator. On top of the positive electrode, a small fleece of nickel-coated iron fiber 139 is placed. The entire unit is moistened with potassium hydroxide of the specific gravity 1.2 and then the second part of the casing 132 is slid over the built up unit with interposition of an annularly-shaped insulating member 138; no sealing between the two parts of the casing is done at this time. The element is first charged and formed so that the gases generated at this time can freely escape. The forming may be done in an evacuated space, or in the atmosphere, or with the unit immersed in distilled water or in potassium hydroxide. In the last mentioned case, the lead-in connections and the casing parts may be placed within electrically insulated supporting elements. After formation is completed, the casing is hermetically sealed with the storage battery being in charged or uncharged condition.

With the storage battery according to example 6, a particular effect is brought about; due to the fact that upon formation the positive electrode will swell, it will press the negative electrode into close contact with its enclosing casing. There is no spring needed between the positive electrode and its casing. All that is needed is the small fleece 139 which serves at the same time for adsorption of potassium hydroxide when during the operation upon overcharging of the storage battery gases should be formed in the interior of the negative electrode.

As mentioned before, the storage battery according to the invention has many advantages. One of the improvements not yet stressed is due to the fact that by the arrangement of the additional electrode with its large internal resistance within the main electrode with low internal resistance, storage batteries may be manufactured which are admirably suited for extremely high sudden loads. A sudden discharge substantially affects that part of the electrode which has the low internal resistance. After the sudden discharge, the part of the electrode with the lower internal resistance is re-charged from the part with the higher internal resistance. With an electrode having very high capacity it is therefore possible to utilize part of the capacity for sudden load, whereas the remainder of the capacity may be used as a reserve. Such electrodes are particularly suited in starter batteries of motor vehicles and the like. The ratio in which the capacity of the electrode is distributed between the part having low internal resistance and the part having high internal resistance can be left to the judgment of the man skilled in the art in accordance with the purpose to be served in each individual case. It is quite possible to make the main electrode with the low internal resistance practically serve only as a shell for the additional electrode with the large internal resistance, if it is desired to charge the storage battery with frequent but comparatively small loads.

When, as mentioned before, the electrodes are made of sintered supports for the active mass, these electrodes have particularly high mechanical strength which will enable them to withstand high pressures occurring upon overcharging of the battery.

In the foregoing description it has been mentioned consistently that one or both electrodes may be joined to the casing walls by sintering. However, it should be understood that the joining may instead be effected by spot-welding, which has likewise proved very satisfactory.

The term "metal fibers" as used in this specification and the appended claims is deemed to include metal wires, threads, chips, grains and the like shapes, the metal of which lends itself to the production of electrode supports. Where the use of metal carbonyls is mentioned, it is likewise intended to include such carbonyl compounds which lend themselves to the purpose in question.

As regards the shape of the cavities provided in the electrode or electrodes for receiving the mixture of gas-adsorbing material and active mass, they may be of various configuration and location, as will have become apparent from the embodiments illustrated in the drawings.

In general, it should be understood that the foregoing disclosure relates only to several preferred embodiments of the invention which are given by way of illustration and not of limitation; it is intended to cover all changes and modifications of the exemplified embodiments which do not constitute departures from the spirit and scope of the invention as set forth in the appended claims.

What is claimed is:

1. An hermetically sealed storage battery, comprising a casing and arranged therein at least one positive electrode, at least one negative electrode, a porous separator therebetween for absorbing an electrolyte, said electrodes and separator occupying substantially the entire volume within said casing, at least one of said electrodes being made of a porous fibrous material firmly secured directly to said casing and having a cavity therein, and means for adsorbing the gas generated within said casing, said means comprising a mixture of a gas adsorbing material and an active electrode mass situated within said cavity.

2. An hermetically sealed storage battery according to claim 1, wherein said mixture comprises 20 to 60% gas adsorbing material.

3. An hermetically sealed storage battery according to claim 2 wherein said gas adsorbing material consists of activated carbon.

4. An hermetically sealed storage battery according to claim 1 wherein said electrodes include a fibrous material with the fibers sintered together to form a support for the active mass, at least some of the surface fibers of said electrodes being sintered to said casing.

5. An hermetically sealed storage battery according to claim 4 wherein said mixture comprises 20 to 60% gas adsorbing material.

6. An hermetically sealed storage battery, comprising a casing and arranged therein at least one main positive electrode, at least one main negative electrode, a porous separator therebetween for absorbing an electrolyte, said electrodes and separator occupying substantially the entire volume within said casing, at least one of said electrodes being made of a highly porous fibrous material firmly secured directly to said casing and having a cavity therein, a secondary electrode located in said cavity and having a higher internal resistance than that of said one electrode, said secondary electrode comprising a mixture of a gas-adsorbing material and an active electrode mass for adsorbing the gas generated within said casing.

7. An hermetically sealed storage battery according to claim 6 wherein said secondary electrode comprises 20 to 60% of a gas adsorbing material.

8. An hermetically sealed storage battery according to claim 7 wherein said gas adsorbing material comprises activated carbon.

9. An hermetically sealed storage battery according to claim 6 wherein said main electrodes include a fibrous material having the fibers sintered together to form a support for the active mass, at least one exterior surface of said main electrode being sintered to the casing of said battery.

10. The hermetically sealed storage battery as claimed in claim 1, wherein all electrodes have cavities filled with a mixture comprising gas-adsorbing material and active electrode mass.

11. An hermetically sealed storage battery as claimed in claim 1, wherein said first electrode is arranged so that the cavity therein is facing said second electrode.

12. An hermetically sealed storage battery according to claim 1, wherein the cavity in said first electrode faces away from said second electrode.

13. A cell for a hermetically sealed storage battery which comprises a casing, two porous electrodes made of fibrous material impregnated with active mass, a separator arranged between said electrodes, each electrode having a cavity therein, with said cavities facing each other and being filled with a mixture of a gas-adsorbing material and active mass, and a porous electrically conductive plate for covering each of said cavities.

14. A cell for a hermetically sealed storage battery which comprises a casing, two porous electrodes made of fibrous material impregnated with active mass, a separator arranged between said electrodes, one of the electrodes being a two-part electrode, each part having a cavity which in the assembled state faces the cavity of the other part and registers therewith to form a hollow space, said space being filled with a mixture of gas-adsorbing material and active mass.

15. A cell for a hermetically sealed storage battery as claimed in claim 14, wherein means are provided for securing the two electrode parts against mutual displacement.

16. An hermetically sealed storage battery according to claim 1, wherein each electrode is sintered with its bottom end only to the end walls of the respective casings, the side walls of said electrodes forming a gap with the side walls of said casings.

17. A cell for a hermetically sealed storage battery, said cell comprising a two-part casing for housing electrodes therein, one part being substantially shaped as a cup; the other part being substantially shaped as a lid; a first porous electrode of fibrous material impregnated with active electrodes mass and firmly sintered with its bottom to the end wall of said cup; a second porous electrode of opposite polarity impregnated with active electrode mass and firmly sintered to said lid; said cup having a depth substantially equal to the height of the two electrodes in assembled position; said first electrode having a cavity therein filled with a mixture of adsorbent material and of active electrode mass and arranged to face said second electrode; a plate for covering said cavity placed adjacent to a separator arranged between said electrodes; and means on both cups for hermetically sealing said cell by mutual engagement thereof.

18. A hermetically sealed storage battery, comprising a cup-shaped casing, a tube-shaped outer electrode fitted into said casing, firmly joined to the entire bottom thereof and to a part of its walls, the electrode consisting of fibrous material and being of highly porous structure filled with active mass, an inner electrode of opposite polarity arranged within said outer electrode, one of said electrodes including hollow space filled with a mixture of gas-adsorbing material and active mass, and a separator arranged between the outer and inner electrodes.

19. A hermetically sealed storage battery, as claimed in claim 18, wherein the outer electrode is the negative electrode and the inner electrode is the positive electrode.

20. A hermetically sealed storage battery, as claimed in claim 19, wherein the inner electrode has a cavity filled with a mixture of gas-adsorbing material and active mass.

21. A hermetically sealed storage battery, as claimed in claim 20, wherein the outer electrode has recesses which, with the casing wall, form hollow spaces filled with said mixture of gas-adsorbing material and active mass.

22. A hermetically sealed storage battery, as claimed in claim 19, wherein the outer electrode is sintered to the side wall of the cup-shaped casing.

23. A hermetically sealed storage battery, as claimed in claim 19, wherein the outer electrode is made to lie closely and under tension against the wall of the casing.

24. An electrode assembly for a hermetically sealed storage battery, said assembly comprising at least one positive and one negative electrode consisting of thin bands of highly porous fibrous material with separator layers interposed therebetween, said electrodes being wound into a coil, wherein at least one of said electrodes has hollow spaces formed therein which are filled with a mixture of a gas-adsorbing material and active mass.

25. An electrode assembly as claimed in claim 24, wherein the electrode containing said mixture of a gas-adsorbing material and active mass is made in two layers.

26. An electrode assembly for a hermetically sealed storage battery, said assembly comprising at least one positive and one negative electrode consisting of thin bands of highly porous fibrous material with separator layers interposed therebetween, said electrodes being wound into a coil, wherein at least one of said electrodes has a projection enclosing a hollow space filled with a mixture of a gas-adsorbing material and active mass.

27. An electrode assembly as claimed in claim 26, wherein said projection is disposed in the interior of said coil.

28. An electrode assembly as claimed in claim 26, wherein said projection is disposed at the outside of said coil.

29. A process for making an electrode for a hermetically sealed storage battery which comprises placing into a cup-shaped casing a highly porous electrically conductive fibrous mass mixed with metal powder, sintering said mass to form an electrode body and simultaneously joining it to said casing, activating said electrode body and subjecting said electrode body to compression, simultaneously forming a cavity therein, filling said cavity with a mixture comprising a gas-adsorbing material and an active mass, and covering said cavity with an electrically conductive closure member.

30. The process as claimed in claim 29, further comprising the steps of interposing a fusion-resistant foil between the side walls of said casing and of said electrode body before sintering the parts and removing said foil after sintering has been effected.

31. A process for making a cell for a hermetically sealed storage battery, comprising assembling an electrode made according to claim 29 with a second electrode and interposing a separator therebetween.

32. A process for making an electrode assembly for a hermetically sealed storage battery as claimed in claim 18, which comprises cutting from a continuous tubing a piece conforming in length to said outer electrode, activating said cut piece, assembling it with a cup-shaped casing and inserting into it an inner electrode with interposition of a separator.

33. A process for making an electrode assembly for a hermetically sealed storage battery as claimed in claim 18, which comprises cutting from a continuous tubing a piece conforming in length to said outer electrode, assembling said electrode with a cup-shaped casing, sintering the electrode to the casing wall, and activating the electrode.

34. A process for making an electrode assembly for a hermetically sealed storage battery which comprises passing an endless band of matted fibrous material, subsequently to form the electrode body, and an endless metal strip, subsequently to form the casing wall of said assembly, over a support for combining said band and said strip into a double layer, cutting the combined double layer to size, shaping the cut pieces into circular form with the ends lying in abutting relationship, and joining the ends to form a hermetically closed seam.

35. The process as claimed in claim 34, including the step of sintering the matted fibrous band and the metal strip together to form a firm adhesion therebetween.

36. The process as claimed in claim 34, including the step of placing between the endless band and the endless metal strip porous inserts of adsorbing material to be activated in a subsequent operation together with the electrode body.

37. A process for making an electrode assembly as claimed in claim 24, which comprises placing between endless bands of porous supporting material active mass inserts of a porous gas-adsorbing material, sintering said endless bands together and activating the structure so obtained before cutting pieces to size and winding them into a coil.

References Cited in the file of this patent
UNITED STATES PATENTS

| | | |
|---|---|---|
| 386,150 | Meserole | July 17, 1888 |
| 793,077 | Hubbell | June 27, 1905 |
| 1,377,645 | Weiss | May 10, 1921 |
| 2,131,592 | Lange et al. | Sept. 27, 1938 |
| 2,544,112 | Schneider | Mar. 6, 1951 |
| 2,544,447 | Sargent | May 22, 1951 |
| 2,566,114 | Bloch | Aug. 28, 1951 |
| 2,610,220 | Brennan | Sept. 9, 1952 |
| 2,615,932 | Marko et al. | Oct. 28, 1952 |
| 2,651,669 | Neumann | Sept. 8, 1953 |
| 2,681,375 | Vogt | June 15, 1954 |
| 2,798,110 | Peters | July 2, 1957 |
| 2,810,008 | Bickerman | Oct. 15, 1957 |
| 2,977,401 | Marsal et al. | Mar. 28, 1961 |

FOREIGN PATENTS

| | | |
|---|---|---|
| 165,982 | Australia | Nov. 14, 1955 |
| 741,345 | Great Britain | Nov. 30, 1955 |